(12) United States Patent
Ooe (10) Patent No.: US 12,454,420 B2
(45) Date of Patent: Oct. 28, 2025

(54) RAISING AND LOWERING APPARATUS AND TRANSPORT CARRIAGE

(71) Applicant: DAIFUKU CO., LTD., Osaka (JP)

(72) Inventor: Masahiro Ooe, Hino-cho (JP)

(73) Assignee: Daifuku Co., Ltd., Osaka (JP)

( * ) Notice: Subject to any disclaimer, the term of this patent is extended or adjusted under 35 U.S.C. 154(b) by 338 days.

(21) Appl. No.: 18/152,997

(22) Filed: Jan. 11, 2023

(65) Prior Publication Data

US 2023/0219768 A1 Jul. 13, 2023

(30) Foreign Application Priority Data

Jan. 12, 2022 (JP) ................................ 2022-003042

(51) Int. Cl.
| | | |
|---|---|---|
| *B65G 47/22* | (2006.01) | |
| *B66F 7/06* | (2006.01) | |
| *B66F 7/10* | (2006.01) | |
| *B66F 7/12* | (2006.01) | |
| *B66F 7/28* | (2006.01) | |

(52) U.S. Cl.
CPC ............ *B65G 47/22* (2013.01); *B66F 7/0625* (2013.01); *B66F 7/065* (2013.01); *B66F 7/10* (2013.01); *B66F 7/12* (2013.01); *B66F 7/28* (2013.01); *B65G 2201/0261* (2013.01)

(58) Field of Classification Search
CPC .. B65G 47/22; B65G 2201/0261; F16G 13/20
See application file for complete search history.

(56) References Cited

U.S. PATENT DOCUMENTS 3,672,237 A * 6/1972 Nagin ..................... F16G 13/06
198/618
5,156,574 A * 10/1992 Gai ......................... F16G 13/06
474/212
5,184,537 A 2/1993 Kimura et al.
(Continued)

FOREIGN PATENT DOCUMENTS

JP 61-168098 10/1986
JP 01-070790 5/1989
(Continued)

OTHER PUBLICATIONS

Japanese Office Action and English translation thereof for Japanese Application No. 2022-003042 mailed Aug. 20, 2024.

*Primary Examiner* — Seahee Hong
(74) *Attorney, Agent, or Firm* — Harness, Dickey & Pierce, P.L.C.

(57) ABSTRACT

Provided is a raising and lowering apparatus which enables achievement of a design that enables a reduction in height of a stage in a raising and lowering direction while reducing the buckling of a push chain. The raising and lowering apparatus includes a push chain (10), a stage (12), a guide (14), and a sprocket (16). The push chain has a first straight rod part (10A) that extends along a first direction (D1), a second straight rod part (10B) that extends along a second direction (D2), and a first bent part (10C) that is provided between the first straight rod part and the second straight rod part. The stage is formed on the first straight rod part and is raised and lowered along the first direction. The sprocket engages with a push chain on a side closer to the second straight rod part than to the first bent part.

11 Claims, 7 Drawing Sheets

(56) References Cited

U.S. PATENT DOCUMENTS

| | | | |
|---|---|---|---|
| 5,199,692 A | 4/1993 | Kimura et al. | |
| 5,271,182 A * | 12/1993 | Greisner | B66F 3/06 49/325 |
| 6,109,424 A | 8/2000 | Doan | |
| 6,224,037 B1 * | 5/2001 | Novick | B66F 3/06 254/95 |
| 8,250,846 B2 * | 8/2012 | Soerensen | F16G 13/20 474/212 |
| 2008/0315168 A1 * | 12/2008 | Takeuchi | B66F 3/06 254/358 |
| 2010/0140572 A1 * | 6/2010 | Aoki | F16G 13/20 474/217 |
| 2012/0167542 A1 * | 7/2012 | Oitaka | F16G 13/20 59/85 |
| 2012/0261629 A1 * | 10/2012 | Andkjar | B66F 3/06 254/264 |
| 2013/0205926 A1 * | 8/2013 | Huang | F16G 13/20 74/30 |
| 2013/0276422 A1 * | 10/2013 | Saji | F16G 13/20 59/93 |
| 2013/0283945 A1 * | 10/2013 | Kaisaku | B66F 13/005 74/89.21 |
| 2013/0312554 A1 * | 11/2013 | Saji | F16G 13/20 74/89.21 |
| 2018/0216703 A1 * | 8/2018 | Etori | B66F 7/28 |
| 2019/0039866 A1 * | 2/2019 | Ooe | B66F 7/0666 |

FOREIGN PATENT DOCUMENTS

| | | |
|---|---|---|
| JP | H3120923 U | 12/1991 |
| JP | H6240944 A | 8/1994 |
| JP | 11-049487 | 2/1999 |
| JP | 2006-45844 | 2/2006 |
| JP | 2006-137526 | 6/2006 |
| JP | 2014-234904 | 12/2014 |
| JP | 201530304 A | 2/2015 |
| JP | 2016112614 A | 6/2016 |
| JP | 201748812 A | 3/2017 |
| WO | 2020/031878 A1 | 2/2020 |

* cited by examiner

RAISING AND LOWERING APPARATUS AND TRANSPORT CARRIAGE

This Nonprovisional application claims priority under 35 U.S.C. § 119 on Patent Application No. 2022-003042 filed in Japan on Jan. 12, 2022, the entire contents of which are hereby incorporated by reference.

TECHNICAL FIELD

The present disclosure relates to: a raising and lowering apparatus that includes a push chain; and a transport carriage that is provided with the raising and lowering apparatus.

BACKGROUND ART

Patent Literature 1 discloses a transport carriage that is used in an assembly line by which parts are assembled to a vehicle body in a production line of an automobile and that has a function of transporting the vehicle body and raising and lowering the vehicle body. In Patent Literature 1, an engagement chain is used for raising and lowering a support that supports the vehicle body.

CITATION LIST

Patent Literature

Patent Literature 1

Japanese Patent Application Publication Tokukai No. 2015-30304

SUMMARY OF INVENTION

Technical Problem

From the viewpoint of cost reduction or simplification of the apparatus, it is conceivable to replace the engagement chain of Patent Literature 1 with a single push chain. However, in this case, in order to reduce buckling of the push chain, it is necessary to provide a guide that is for the push chain and that has a certain height in a raising and lowering direction of the support, which in turn leads to a raising and lowering mechanism having an enormous size in the raising and lowering direction of the support.

Therefore, in the transport carriage provided with the above-described raising and lowering mechanism, the height of a floor part on which a worker who performs work on the vehicle body or the like which is raised and lowered by the above-described raising and lowering mechanism is increased. To reduce the height of the floor part while keeping the height of the raising and lowering mechanism in the raising and lowering direction as it is, it is necessary to complicate the structure of the raising and lowering mechanism or the floor part, and, in some cases, a distance in which the raising and lowering mechanism can be raised and lowered may be shortened.

Solution to Problem

A raising and lowering apparatus in accordance with an aspect of the present disclosure includes: a push chain comprising: a first straight rod part that extends along a first direction; a second straight rod part that extends along a second direction which differs from the first direction; and a first bent part that is provided between the first straight rod part and the second straight rod part, the push chain being configured to move forward and backward in the first direction and the second direction; a stage formed on the first straight rod part and configured to be raised and lowered along the first direction by forward and backward movement of the push chain; a guide configured to guide the forward and backward movement of the push chain in at least a portion of the first straight rod part and in at least a portion of the first bent part; and a sprocket that engages with a portion of the push chain which is on a side closer to the second straight rod part than to the first bent part, the sprocket being configured to drive the push chain to move forward and backward.

Advantageous Effects of Invention

According to an aspect of the present disclosure, it is possible to achieve a design that reduces the height of the raising and lowering apparatus in the raising and lowering direction of a stage while reducing buckling of the push chain.

DESCRIPTION OF EMBODIMENTS

Embodiment 1

<Transport Carriage>

Figure 2:
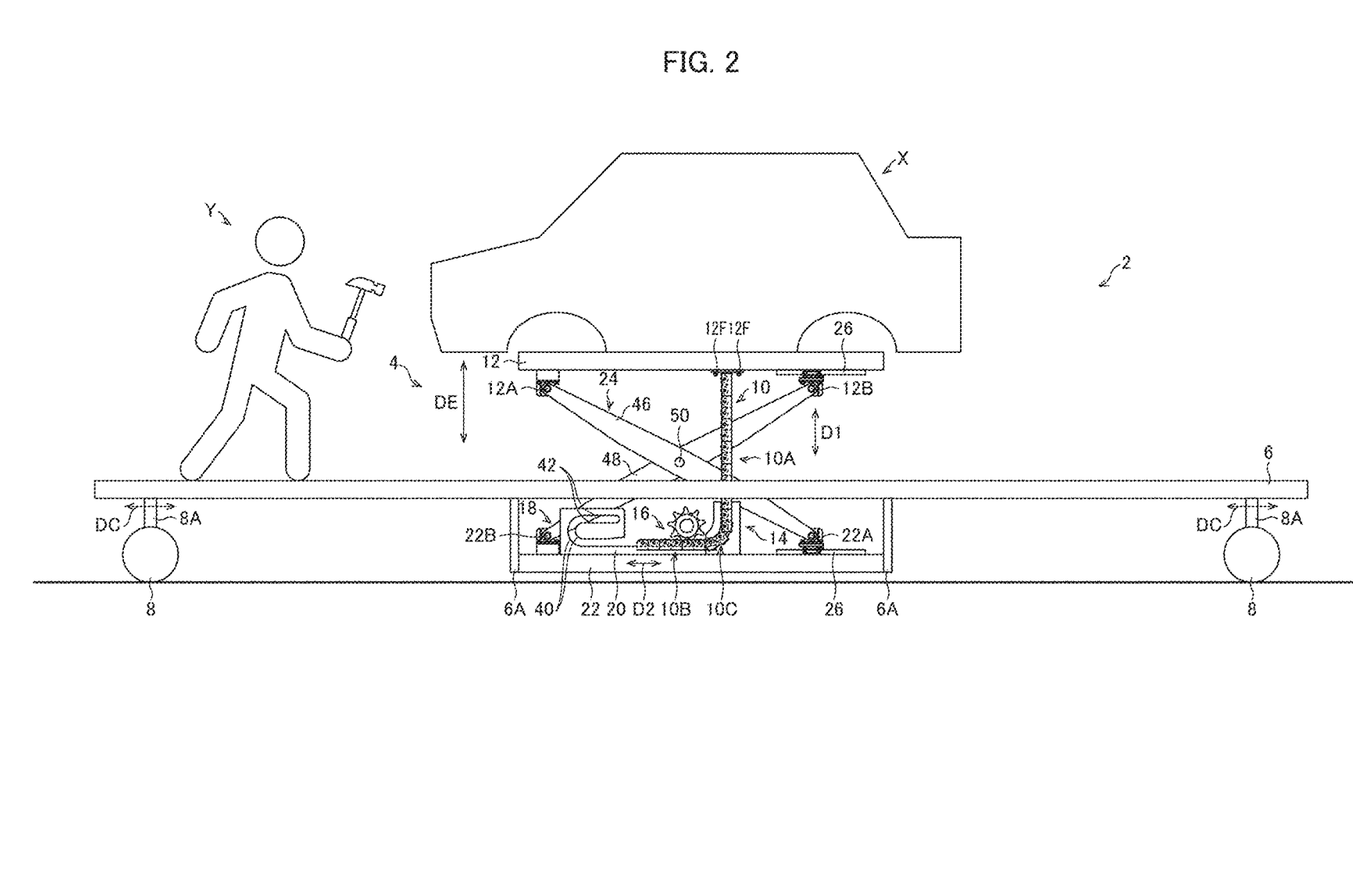
FIG. 2 is a schematic side view of a transport carriage in accordance with Embodiment 1 of the present disclosure.

FIG. 2 is a schematic side view for describing an overall configuration of a transport carriage in accordance with the present embodiment. Note that the following description of the present embodiment will be provided by taking, as an example, a transport carriage that is used in an assembly line by which parts are assembled to a vehicle body in a production line of an automobile and that has a function of transporting the vehicle body and raising and lowering the vehicle body. However, the transport carriage in this specification is not limited to such a transport carriage, a target object to be transported and to be raised and lowered is not particularly limited, and a transport carriage that transports the target object and raises and lowers the target object may be realized by appropriately changing a member that supports the target object.

A transport carriage 2 in accordance with the present embodiment includes a lifter (raising and lowering apparatus) 4, a floor part 6, and wheels 8, as illustrated in FIG. 2. The lifter 4 is, for example, an apparatus which supports a vehicle body X illustrated in FIG. 2 and raises and lowers the vehicle body X along a raising and lowering direction DE, by a method described later. The floor part 6 is a platform on which a worker Y who performs work such as assembly of parts to the vehicle body X supported by the lifter 4 rides. The wheels 8 are, for example, wheels which are attached to a lower side of the floor part 6 and which are for moving the floor part 6 along a transport direction DC by being rotationally driven by a drive unit (not illustrated). Note that the wheels 8 are not limited to the driving wheels described above, and may be driven wheels which are rotated when the transport carriage 2 itself is pushed or pulled by an external force.

Note that, in the present embodiment, an angle which the raising and lowering direction DE forms with the vertical direction is smaller than an angle which the transport direction DC forms with the vertical direction. For example, the raising and lowering direction DE is substantially the same direction as the vertical direction, and thus the vehicle body X is raised and lowered in a substantially vertical direction by the lifter 4. Further, for example, the transport direction DC may be parallel to the ground with which the wheels 8 are in contact or may be substantially the same direction as a horizontal direction that is orthogonal to the vertical direction.

Further, the wheels 8 may be formed on a rail (not illustrated). In this case, the transport direction DC may be substantially the same as a direction in which the rail extends. In other words, the transport carriage 2 may move along the rail. Meanwhile, the wheels 8 may be formed at respective lower ends of wheel support columns 8A that extend in a substantially vertical direction, and the wheels 8 may rotate about the wheel support columns 8A. In this case, the transport carriage 2 may move freely on a certain plane such as the ground.

For example, the lifter 4 is supported on the lower side of the floor part 6 by floor part support columns 6A that extend from below the floor part 6, as illustrated in FIG. 2. In other words, the lifter 4 and the floor part 6 are integrally formed. With such a configuration, when the floor part 6 moves in the transport direction DC along with the rotation of the wheels 8, the lifter 4 also moves in the transport direction DC, and thus the vehicle body X supported by the lifter 4 also moves in the transport direction DC. Thus, the transport carriage 2 enables raising and lowering of the vehicle body X in the raising and lowering direction DE by the lifter 4 while moving the vehicle body X supported by the lifter 4 and the worker Y on the floor part 6 together in the transport direction DC. Therefore, the transport carriage 2 enables raising and lowering of the vehicle body X in the raising and lowering direction DE while transporting the vehicle body X in the transport direction DC, and enables the worker Y on the floor part 6 to perform work on the vehicle body X.

The raising and lowering of the vehicle body X by the lifter 4 and the transport of the vehicle body X by the rotation driving of the wheels 8 may be realized through control of the lifter 4 by a control unit (not illustrated) and through control of a drive unit of the wheels 8. The transport carriage 2 may include the control unit. Alternatively, the control unit may control each member of the transport carriage 2 through transmission of control contents to the transport carriage 2 by a communication means (not illustrated).

<Overview of Lifter>

Figure 3:
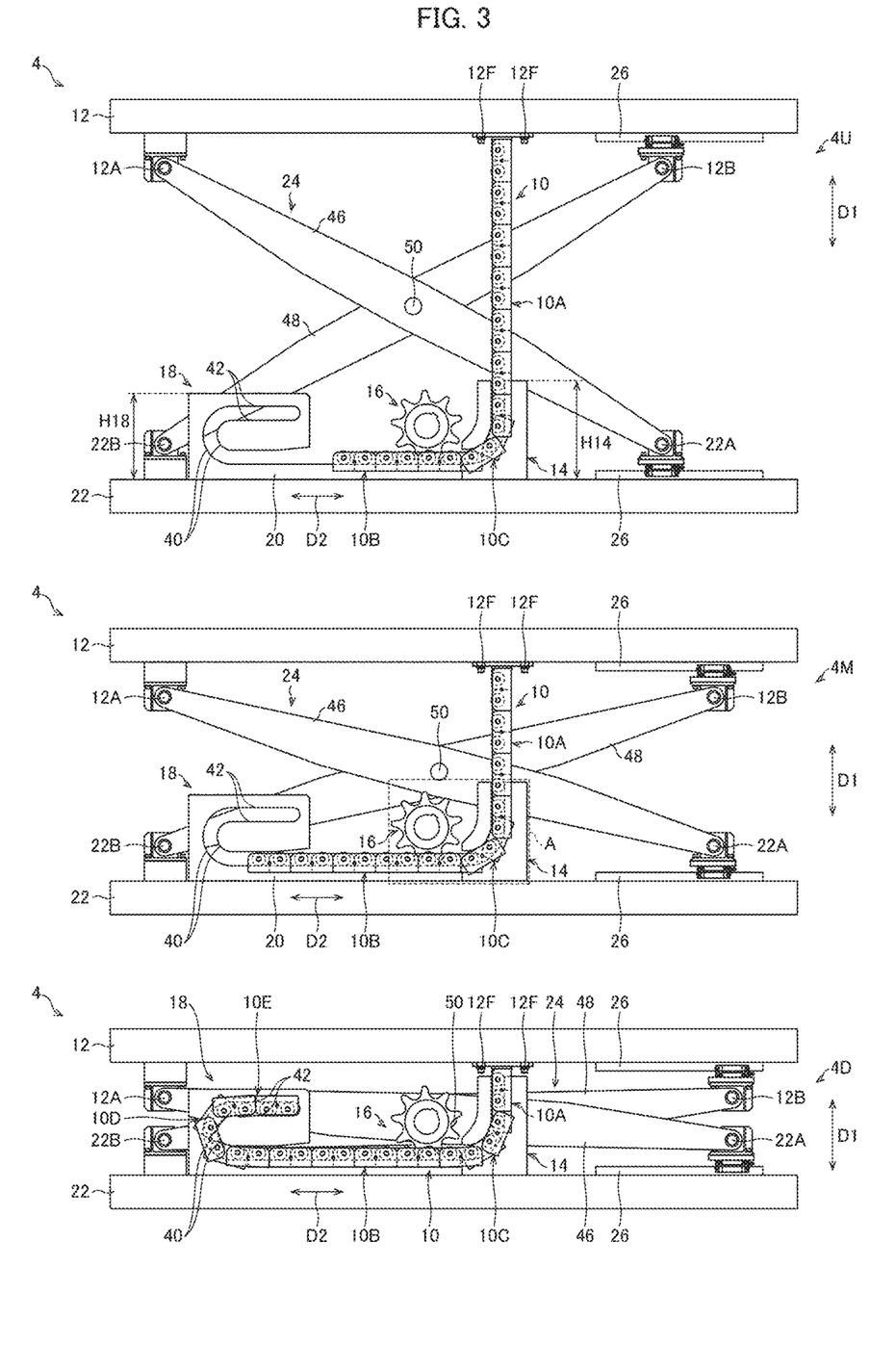
FIG. 3 is a schematic side view of the lifter in accordance with Embodiment 1 of the present disclosure.

Next, the lifter 4 provided in the transport carriage 2 in accordance with the present embodiment will be described in more detail with reference to FIG. 3. FIG. 3 is a schematic side view for describing the overall configuration of the lifter 4 in accordance with the present embodiment and a raising and lowering operation of the lifter 4. Note that, in order to illustrate each member of the lifter 4 in more detail, FIG. 3 illustrates some members, such as a link mechanism 24 and a link rail 26 (described later), of the lifter 4 in a transparent manner.

FIG. 3 illustrates a raised state 4U in which the lifter 4 supports the vehicle body X at a upper level in the raising and lowering direction DE and a lowered state 4D in which the lifter 4 supports the vehicle body X at a level which is lower in the raising and lowering direction DE than the level in the raised state 4U. Further, FIG. 3 illustrates an intermediate state 4M in which the lifter 4 supports the vehicle body X at a level between the level in the raised state 4U and the level in the lowered state 4D.

As illustrated in FIG. 3, the lifter 4 includes a push chain 10, a stage 12, a guide 14, a sprocket 16, a case 18, a chain support 20, a base 22, the link mechanism 24, and the link rail 26.

<Push Chain>

Figure 1:
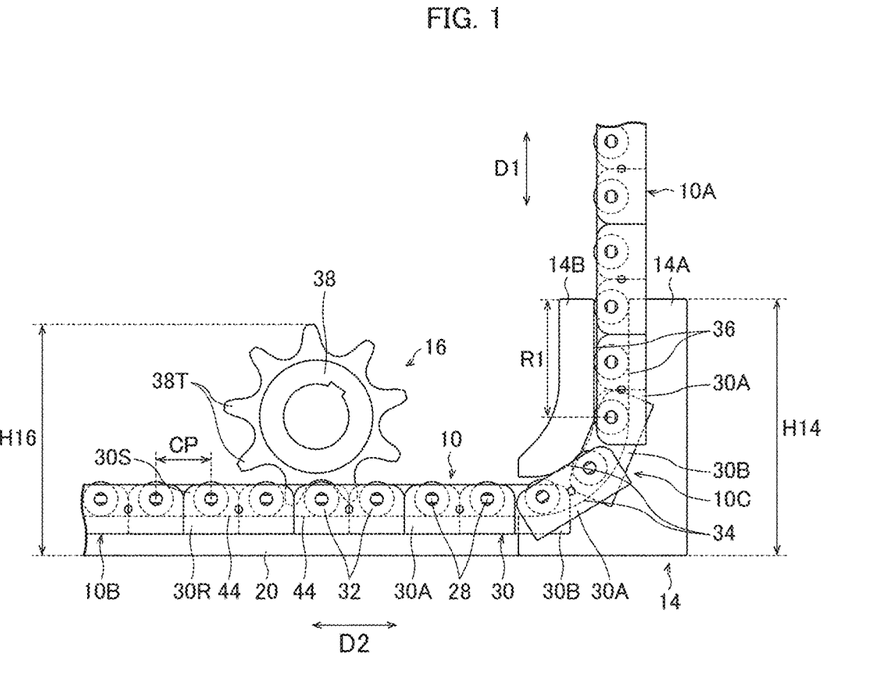
FIG. 1 is a schematic enlarged view of a part of a side surface of a lifter in accordance with Embodiment 1 of the present disclosure.

Each member of the lifter 4 will be further described in more detail with reference to FIGS. 1 and 3 together. FIG. 1 is a schematic enlarged view illustrating, regarding a region A illustrated in the intermediate state 4M of FIG. 3, some members of the lifter 4 in an extracted and enlarged manner. Specifically, FIG. 1 is a schematic enlarged view illustrating, in an enlarged manner, only the push chain 10, the guide 14, the sprocket 16, and the chain support 20, which are located at the periphery of the guide 14 and the sprocket 16, among the members of the lifter 4.

The push chain 10 is a roller chain that can be bent in only one certain direction from a state of being aligned in a substantially straight line. The push chain 10 is, for example, a roller chain in which a plurality of plates 30 are connected to a plurality of pins 28 at opposite ends thereof, and rollers 32 are rotatably fitted to the respective pins 28, as illustrated in FIG. 1.

Specifically, the plates 30 include an outer plate 30A and an inner plate 30B, which is positioned inward of the outer plate 30A in a direction in which the pins 28 extend, and the outer plate 30A and the inner plate 30B are positioned in a staggered manner and are connected to the pins 28. Here, each of the plates 30 includes a bow-shaped portion 30S and a rectangular portion 30R, and the plates 30 are connected in a state of being arranged such that the respective bow-shaped portions 30S face in one and the same direction and that the respective rectangular portions 30R face in the direction opposite to the direction in which the respective bow-shaped portions 30S face.

For example, at least one plate selected from the group consisting of the outer plate 30A and the inner plate 30B is formed so as to be rotatable about the pin 28. Thus, the push chain 10 is flexible in a direction orthogonal to both a longitudinal direction of the pin 28 and a connection direction of the push chain 10. However, interference between the rectangular portions 30R of the outer plates 30A that are adjacent to each other or between the rectangular portions 30R of the inner plates 30B that are adjacent to each other restricts the push chain 10 from being bent toward the rectangular portion 30R side from a state in which the push chain 10 is arranged in a substantially straight line. In other words, the push chain 10 is bent only toward the bow-shaped portion 30S side from a state in which the push chain 10 is arranged in a substantially straight line.

In the present embodiment, as illustrated in FIGS. 1 and 3, the push chain 10 includes a first straight rod part 10A, a second straight rod part 10B, and a first bent part 10C, which is provided between the first straight rod part 10A and the second straight rod part 10B. Here, in this specification, the "straight rod part" of the push chain 10 refers to a part that is restricted from being outwardly bent toward the rectangular portion 30R side. In addition, in this specification, the "bent part" of the push chain 10 refers to a part that includes a plate 30 which is bent in a direction toward the bow-shaped portion 30S from a state in which the rectangular portions 30R are in contact with each other.

The first straight rod part 10A extends along a first direction D1 illustrated in FIGS. 1 and 3, and the second straight rod part 10B extends along a second direction D2 illustrated in FIGS. 1 and 3. Specifically, an angle which the first direction D1 forms with the vertical direction is smaller than an angle which the second direction D2 forms with the vertical direction. As will be described in detail later, the push chain 10 moves forward and backward in the connection direction thereof by being driven by the sprocket 16. Thus, the push chain 10 moves forward and backward in the first direction D1 and the second direction D2. Specifically, the first straight rod part 10A moves forward and backward along the first direction D1, and the second straight rod part 10B moves along the second direction D2.

Note that the push chain 10 in accordance with the present embodiment is not limited to having the structure illustrated in FIG. 1. For example, as the push chain 10 in accordance with the present embodiment, a conventionally known push chain can be employed, provided that the push chain is bent by a guide (described later) and forms the first straight rod part 10A and the second straight rod part 10B.

<Stage>

The stage 12 is a support that supports the vehicle body X, is formed on the first straight rod part 10A, and is formed at an end of the first straight rod part 10A on the opposite side from the first bent part 10C through, for example, a fixture 12F such as a bolt and a nut. Thus, the stage 12 is raised and lowered along the first direction D1 together with the vehicle body X along with forward and backward movement of the first straight rod part 10A along the first direction D1. Therefore, the raising and lowering direction DE, which is a direction in which the transport carriage 2 raises and lowers the vehicle body X, is substantially the same direction as the first direction D1, which is a direction in which the first straight rod part 10A moves forward and backward. Since the angle which the first direction D1 forms with the vertical direction is smaller than the angle which the second direction D2 forms with the vertical direction, the lifter 4 can be configured to be more suitable as the raising and lowering mechanism of the transport carriage 2 when the first direction D1 is the raising and lowering direction DE.

Thus, as the push chain 10 moves from the first straight rod part 10A side to the second straight rod part 10B side, the stage 12 is pulled by the push chain 10 and is lowered toward a lower position in the first direction D1. For example, when the push chain 10 of the lifter 4 in the raised state 4U moves from the first straight rod part 10A side to the second straight rod part 10B side, the lifter 4 transitions to the lowered state 4D through the intermediate state 4M along with the movement of the push chain 10 and the lowering of the stage 12.

Further, as the push chain 10 moves from the second straight rod part 10B side to the first straight rod part 10A side, the first straight rod part 10A of the push chain 10 moves further upward from above the guide 14 (described later). Here, the first straight rod part 10A is restricted from being bent toward the rectangular portion 30R side, and is also restricted from being bent toward the bow-shaped portion 30S side by the link mechanism 24 (described later). Thus, the first straight rod part 10A continues to move further upward of the guide 14 without being bent, and pushes the stage 12 upward.

Thus, as the push chain 10 moves from the second straight rod part 10B side to the first straight rod part 10A side, the stage 12 is pushed by the push chain 10 and is raised toward an upper position in the first direction D1. For example, when the push chain 10 of the lifter 4 in the lowered state 4D moves from the second straight rod part 10B side to the first straight rod part 10A side, the lifter 4 transitions to the raised state 4U through the intermediate state 4M along with the movement of the push chain 10 and the raising of the stage 12.

For example, an opening may be formed in the floor part 6 so as to be of substantially identical shape with the stage 12 or so as to be larger in size than the stage 12, and the stage 12 may pass through the opening and be raised toward an upper position in the raising and lowering direction DE. Further, in a case where the lifter 4 is in the lowered state 4D, an upper surface of the stage 12 may be positioned substantially flush with an upper surface of the floor part 6.

<Guide>

The guide 14 is a guide that guides the direction in which the push chain 10 moves forward and backward, in at least some area of the first straight rod part 10A and in at least some area of the first bent part 10C. As illustrated in FIG. 1, the guide 14 includes: a pair of curved surface parts 34 that are curved toward the bow-shaped portion 30S side; and a pair of flat surface parts 36 that extend along the first direction D1. The curved surface parts 34 allow the roller 32 included in the first bent part 10C of the push chain 10 to be held therebetween, and the flat surface parts 36 allow the roller 32 included in the first straight rod part 10A to be held therebetween.

For example, the guide 14 includes: a first guide 14A that has one of the curved surface parts 34 and one of the flat surface parts 36; and a second guide 14B that has the other one of the curved surface parts 34 and the other one of the flat surface parts 36. In the first guide 14A and the second guide 14B, the curved surface parts 34 and the flat surface parts 36 may be formed seamlessly.

For example, in a case where the push chain 10 moves toward the first straight rod part 10A side, the roller 32 positioned in the second straight rod part 10B at a position closer to the first bent part 10C is held between the curved surface parts 34. Here, when the roller 32 is pressed against the curved surface parts 34 that are curved toward the bow-shaped portion 30S side, a portion of the push chain 10 which comes into contact with the curved surface parts 34 is bent toward the bow-shaped portion 30S side and becomes the first bent part 10C.

Further, in a case where the push chain 10 moves toward the first straight rod part 10A side, the roller 32 positioned in the first bent part 10C at a position closer to the first straight rod part 10A is held between the flat surface parts 36. Here, a portion of the push chain 10 where the roller 32 is held between the flat surface parts 36 that extend along the first direction D1 is straightened in a direction along the first direction D1 and becomes the first straight rod part 10A.

The guide 14 guides the direction in which the push chain 10 moves by means of the pair of curved surface parts 34 between which the roller 32 of the push chain 10 is held and the pair of flat surface parts 36 between which the roller 32 of the push chain 10 is held. This enables the guide 14 to guide the push chain 10 without having a complicated mechanism such as a rail which restrains the push chain 10. Thus, in the lifter 4 in accordance with the present embodiment, it is possible to simplify the guide 14.

For example, a distance between adjacent pins 28 is defined as chain pitch CP. In this case, a distance R1 in which the push chain 10 is held between the flat surface parts 36 extending along the first direction D1 is equal to or greater than twice the chain pitch CP. Thus, for the first straight rod part 10A, the push chain 10 is straightened in the first direction D1 by the flat surface parts 36 by the length that is at least equal to or greater than twice the chain pitch CP. This enables the guide 14 to prevent the possibility that the first straight rod part 10A which is away from the flat surface parts 36 bends toward the bow-shaped portion 30S side.

<Sprocket>

The sprocket 16 has, for example, a structure in which a plurality of teeth 38T are formed around a disk part 38. The sprocket 16 rotates around the center of the disk part 38 by a power unit (not illustrated). Further, when the teeth 38T of the sprocket 16 are inserted between the plurality of rollers 32 of the push chain 10, the sprocket 16 engages with the push chain 10.

With such a configuration, the sprocket 16 rotates around the center of the disk part 38 in a state of being engaged with the push chain 10, so that the teeth 38T push the rollers 32 to move the push chain 10 forward and backward. Thus, the sprocket 16 moves the push chain 10 forward and backward, which, in turn, causes the stage 12 formed on the first straight rod part 10A to be raised and lowered along the first direction D1.

The sprocket 16 engages with the push chain 10 on a side closer to the second straight rod part 10B than to the first bent part 10C. Specifically, in the present embodiment, the sprocket 16 engages only with the second straight rod part 10B. In this case, the winding angle of the push chain 10 with respect to the sprocket 16 becomes smaller than the winding angle of the push chain 10 in a case where the sprocket 16 engages with the first bent part 10C. Thus, with the above-described configuration, the lifter 4 achieves a reduction of variations in speed of the forward and backward movement of the push chain 10.

Further, the sprocket 16 engages with the push chain 10 from the upper side of the push chain 10 in the first direction D1. Thus, the dimension formed by the guide 14 and the sprocket 16 along the first direction D1 is a distance from the lower end of the guide 14 to one upper end positioned closer to the upper side in the first direction D1, among the respective upper ends of the guide 14 and the sprocket 16. Therefore, the lifter 4 enables a reduction in the dimension of the entire lifter along the first direction D1, as compared to the case where the sprocket 16 engages with the push chain 10 from the lower side of the push chain 10 in the first direction D1.

<Case and Chain Support>

The case 18 is an accommodation part for accommodating a portion of the push chain 10 and includes, as illustrated in FIG. 3, a pair of curved surface parts 40 which are curved toward the bow-shaped portion 30S side and a pair of flat surface parts 42 which extend along the second direction D2.

For example, when the push chain 10 continues to move further toward the second straight rod part 10B side, the roller 32 positioned at an end of the second straight rod part 10B on the case 18 side is held between the curved surface parts 40. Here, when the roller 32 is held between the curved surface parts 40 that are curved toward the bow-shaped portion 30S side, a portion of the push chain 10 which comes into contact with the curved surface parts 40 is bent toward the bow-shaped portion 30S side. This forms, in the push chain 10, a second bent part 10D that is positioned on an opposite side of the second straight rod part 10B from the first straight rod part 10A, for example, as illustrated in the lowered state 4D in FIG. 3.

Further, when the push chain 10 continues to move further toward the second bent part 10D side, the roller 32 positioned at an end of the second bent part 10D on the opposite side from the second straight rod part 10B is held between the flat surface parts 42. Here, a portion of the push chain 10 where the roller 32 is held between the flat surface parts 42 that extend along the second direction D2 is straightened in a direction along the second direction D2. This forms, in the push chain 10, a third straight rod part 10E that is positioned on an opposite side of the second bent part 10D from the first straight rod part 10A, for example, as illustrated in the lowered state 4D in FIG. 3.

Specifically, the third straight rod part 10E extends along a third direction which is a direction such that an angle which the third direction forms with the second direction D2 is smaller than an angle which the third direction forms with the first direction D1. For example, the third straight rod part 10E may extend along the second direction D2, as is the case with the second straight rod part 10B, as illustrated in the lowered state 4D in FIG. 3. In this case, the third straight rod part 10E moves forward and backward in a direction that is parallel to the second straight rod part 10B and that is opposite to a direction in which the second straight rod part 10B moves.

As illustrated in the lowered state 4D in FIG. 3, a portion of the push chain 10 is stored in the case 18 in a state of being bent in the second bent part 10D. Thus, the lifter 4 that is provided with the push chain 10 having the second bent part 10D and the third straight rod part 10E enables a reduction in the dimension of the lifter 4 in a direction orthogonal to the raising and lowering direction. Therefore, even in a case where the push chain 10 is elongated to increase the distance of the raising and lowering of the stage 12 in the first direction D1, the lifter 4 enables a reduction in increase in the dimension of the lifter 4 in a direction orthogonal to the raising and lowering direction.

The chain support 20 has, for example, a flat surface part 44 that contacts the roller 32 in the second straight rod part 10B and that supports the second straight rod part 10B, as illustrated in FIG. 1. For example, the flat surface part 44 of the chain support 20 may be formed seamlessly with the end portion, on the second straight rod portion 10B side, of the curved surface parts 34 of the guide 14 and with the curved surface parts 40 of the case 18.

<Base and Link Mechanism>

The base 22 has a substantially coplanar upper surface that supports at least the guide 14, the case 18, and the chain support 20, and is formed on a side lower in the first direction D1 than the side on which the stage 12 is formed. For example, the transport carriage 2 includes the base 22 on the lower side of the floor part 6 in the raising and lowering direction DE. The floor part 6 may be formed integrally with the lifter 4 by supporting the base 22 through the floor part support columns 6A, as illustrated in FIG. 2.

The link mechanism 24, for example, includes: a first link beam 46 and a second link beam 48 which cross each other; and a link shaft 50 which restrains the first link beam 46 and the second link beam 48 in a manner such that the first link beam 46 and the second link beam 48 are pivotable about the link shaft 50. The first link beam 46 is pivotally restrained by a first fixed shaft 12A formed on the lower surface of the stage 12 and by a first slide shaft 22A formed on the upper surface of the base 22. Further, the second link beam 48 is pivotally restrained by a second slide shaft 12B formed on the lower surface of the stage 12 and by a second fixed shaft 22B formed on the upper surface of the base 22.

The link rail 26 is formed on the lower surface of the stage 12 and on the upper surface of the base 22. The link rail 26 on the lower surface of the stage 12 restrains the second slide shaft 12B in a manner such that the second slide shaft 12B is movable in the second direction D2. Further, the link rail 26 on the upper surface of the base 22 restrains the first slide shaft 22A in a manner such that the first slide shaft 22A is movable in the second direction D2.

The first slide shaft 22A and the second slide shaft 12B move on the link rail 26 in the second direction D2 along with the raising and lowering of the stage 12. Meanwhile, the first link beam 46 and the second link beam 48 are restrained by the first fixing shaft 12A and the second fixing shaft 22B so as not to move in the second direction D2, irrespective of the forward and backward movement of the push chain 10. Thus, the first link beam 46 and the second link beam 48 of the link mechanism 24 pivot about the respective shafts along with the forward and backward movement of the push chain 10, and raise and lower the stage 12 while restraining the stage 12 with respect to the base 22.

Specifically, the link mechanism 24 raises and lowers the stage 12 only in the first direction D1 while restraining the stage 12 with respect to the base 22 from moving in the second direction D2. Thus, the stage 12 is raised and lowered only along the first direction D1 without substantially moving in the second direction D2. Further, since the link mechanism 24 restrains the stage 12 from moving in the second direction D2, the link mechanism 24 reduces the bending of the first straight rod part 10A of the push chain 10.

For example, the lifter 4 may include a plurality of link mechanisms 24. For example, in the drawings such as FIGS. 2 and 3, as the paper sheets of the drawings are viewed from the front side thereof, another link mechanism 24 may be formed on the side nearer to the front side than to the side on which the link mechanism 24 illustrated in the drawings is formed. In this case, the drawings such as FIGS. 2 and 3 illustrate the members of the lifter 4 by making transparent the link mechanism 24, the link rail 26, and other members provided on the side nearer to the front side.

Here, for example, as illustrated in FIG. 1, the height from the lower end of the guide 14 to the upper end thereof in the first direction D1 is defined as height H14, and the height from the lower end of the chain support 20 to the upper end of the sprocket 16 in the first direction D1 is defined as height H16. Here, the guide 14 and the chain support 20 are disposed on the upper surface of the base 22 which is substantially coplanar. Thus, a low height H14 indicates that the height of the guide 14 in the first direction D1 is low in the lifter 4, and a low height H16 indicates that the height of the sprocket 16 in the first direction D1 is low in the lifter 4.

As is apparent from FIG. 1, the height H16 is lower than the height H14. In other words, the height of the sprocket 16 in the first direction D1 in accordance with the present embodiment is equal to or lower than the height of the guide 14 in the first direction D1. Thus, the sprocket 16 enables a reduction in the dimension of the entire lifter 4 in the first direction D1. However, as is apparent from the lowered state 4D in FIG. 3, the diameter of the sprocket 16 can be increased without increasing the dimension of the entire lifter 4 in the first direction D1, unless the sprocket 16 comes into contact with the lower surface of the stage 12 in the state of being lowered most. A large diameter of the sprocket 16 allows the torque required to drive the sprocket 16 to be reduced. In a case where the diameter of the sprocket 16 is increased, the power unit that drives the sprocket 16 may also be made large to such an extent that the sprocket 16 does not come into contact with the lower surface of the stage 12.

Further, for example, as illustrated in the raised state 4U in FIG. 3, the height from the lower end of the case 18 to the upper end thereof in the first direction D1 is defined as height H18. Here, the case 18 is also disposed on the upper surface of the base 22 which is substantially coplanar. Thus, a low height H18 indicates that the height of the case 18 in the first direction D1 is low in the lifter 4.

As is apparent from FIG. 3, the height H18 is lower than the height H14. In other words, in the present embodiment, the level of the upper surface of the case 18 in the first direction D1 is lower than the level of the upper surface of the guide 14. Thus, the case 18 enables a reduction in the dimension of the entire lifter 4 in the first direction D.

<Lifter in Accordance with Comparative Embodiment>

Figure 4:
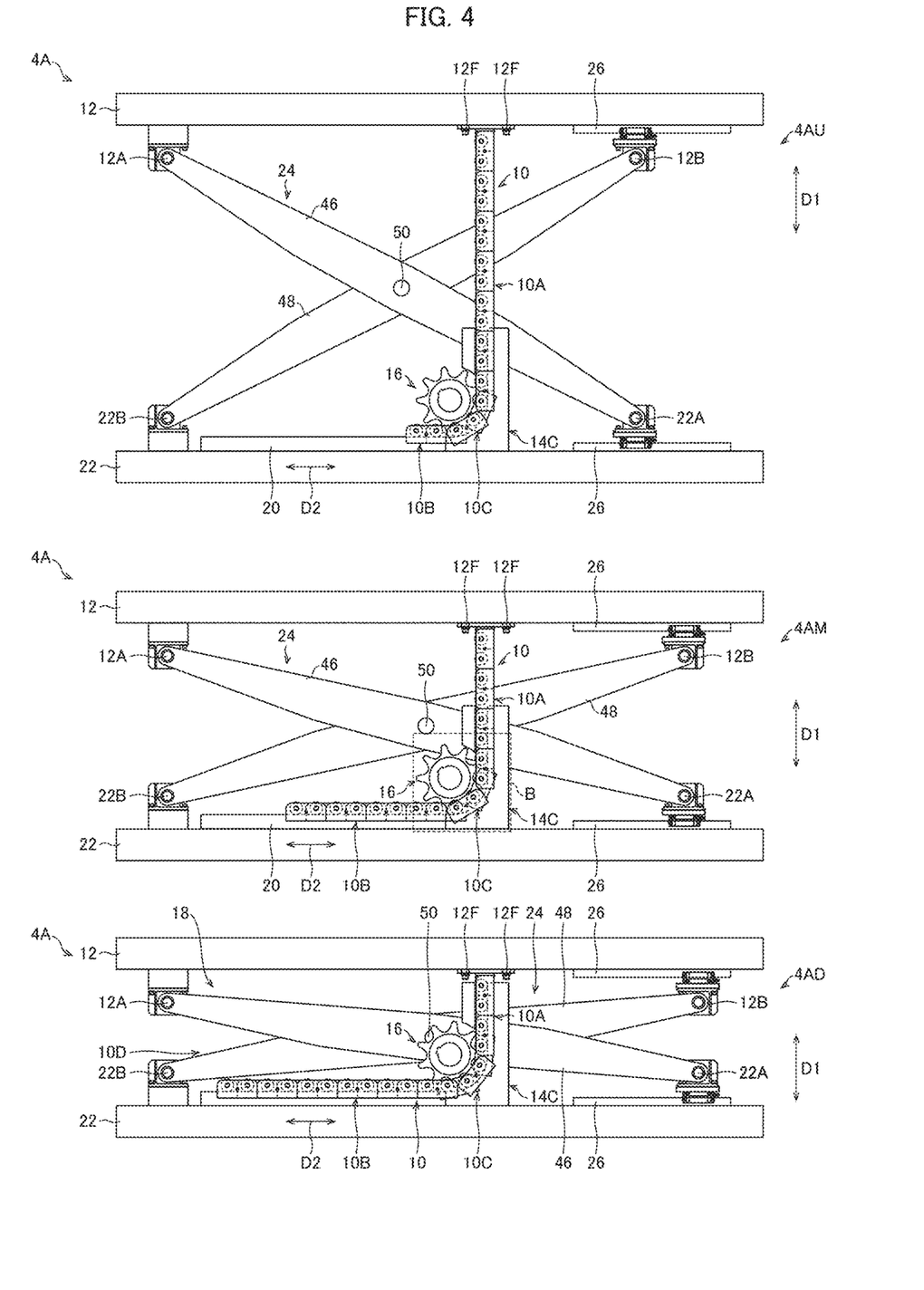
FIG. 4 is a schematic side view of a lifter in accordance with a comparative embodiment.
Figure 5:
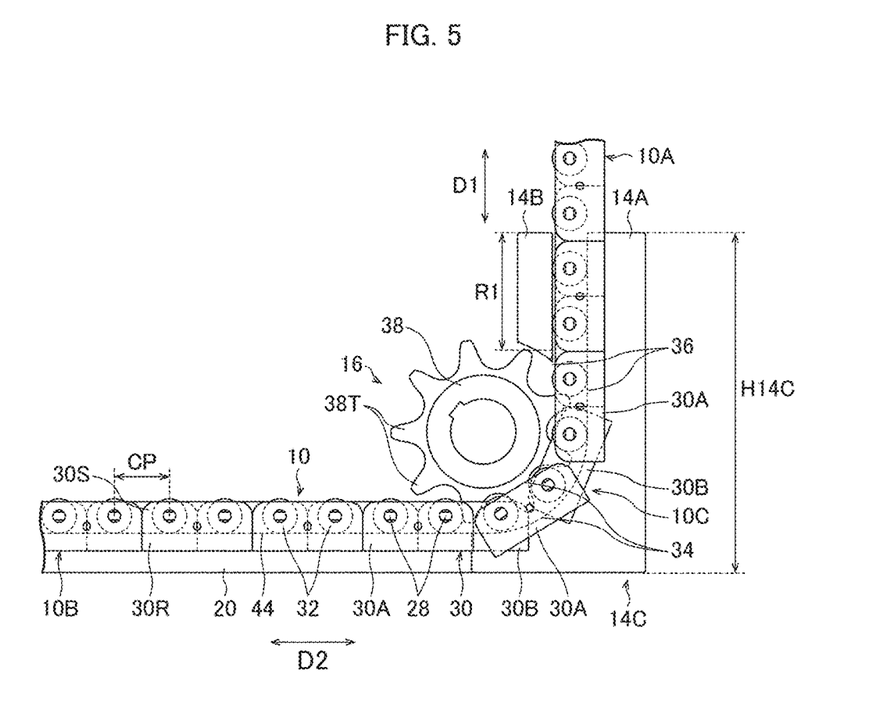
FIG. 5 is a schematic enlarged view of a part of a side surface of the lifter in accordance with the comparative embodiment.

The following will describe the effect brought about by the lifter 4 in accordance with the present embodiment by making comparison with the lifter in accordance with the comparative embodiment. First, the lifter in accordance with the comparative embodiment will be described with reference to FIGS. 4 and 5. FIG. 4 is a schematic side view for describing the overall configuration of a lifter 4A in accordance with the comparative embodiment and the raising and lowering operation of the lifter 4A. FIG. 5 is a schematic enlarged view illustrating, in an enlarged manner, only a push chain 10, a guide 14C, a sprocket 16, and a chain support 20, which are located in a region B illustrated in FIG. 4, among the members of the lifter 4A.

The lifter 4A in accordance with the comparative embodiment differs in configuration from the lifter 4 in accordance with the present embodiment in that the guide 14C is provided instead of the guide 14, the sprocket 16 engages with the first bent part 10C, and the case 18 is not provided.

In the comparative embodiment, as illustrated in FIG. 5, the guide 14C is such that only a first guide 14A has curved surface parts 34 and flat surface parts 36, and a second guide 14B has only flat surface parts 36 which face the flat surface parts 36 of the first guide 14A. Further, in the comparative embodiment, the sprocket 16 engages with the first bent part 10C, and specifically, the roller 32 of the first bent part 10C is held between the curved surface parts 34 of the first guide 14A and the sprocket 16.

In the comparative embodiment, since the sprocket 16 engages with the first bent part 10C, the first straight rod part 10A guided by the guide 14C and the sprocket 16 are close to each other. Thus, in the comparative embodiment, it is necessary to move the position at which the second guide 14B is formed, among the members of the guide 14C, to a position above the sprocket 16 so that the second guide 14B having the flat surface parts 36 between which the roller 32 of the first straight rod part 10A is held does not interfere with the sprocket 16.

As described above, in order to sufficiently reduce the buckling of the first straight rod part 10A, the distance R1 which extends along the first direction D1 and in which the roller 32 of the first straight rod part 10A is held between the flat surface parts 36 needs to be secured so as to be equal to or greater than twice the chain pitch CP. Thus, in order to secure the distance R1 of the flat surface parts 36 along the first direction D1 while moving the second guide 14B to a position above the sprocket 16, the height of the guide 14C in the first direction D1 increases.

For example, as illustrated in FIG. 5, the height from the lower end of the guide 14C to the upper end thereof in the first direction D1 is defined as height H14C. Here, the guide 14C is also disposed on the upper surface of the base 22 which is substantially coplanar. Thus, a low height H14C indicates that the height of the guide 14C in the first direction D1 is low in the lifter 4.

In the comparative embodiment, as described above, the position at which the flat surface parts 36 of the guide 14C are formed moves to a position on the upper side of the lifter 4A in the first direction D1. Thus, the height H14C is higher than the height H14. In other words, the height of the guide 14C in the first direction D1 in accordance with the comparative embodiment is higher than the height of the guide 14 in the first direction D1 in accordance with the present embodiment.

Thus, the height of the entire lifter 4A in accordance with the comparative embodiment increases in the first direction D1 as the height of the entire lifter. Accordingly, the lifter 4A in accordance with the comparative embodiment becomes enormous in the first direction D1 and also shortens the distance of the raising and lowering of the stage 12 by an increased amount of the height of the guide 14C in the first direction D1.

For example, in a case where the transport carriage 2 includes the lifter 4A in accordance with the comparative embodiment, the height of the floor part 6 of the transport carriage 2 in the raising and lowering direction DE increases by an increased amount of the height of the lifter 4A in the first direction D1, and thus increases the burden on the worker Y who raises and lowers the floor part 6. In addition, since the height of the floor part 6 of the transport carriage 2 in the raising and lowering direction DE increases, a space for performing assembly of parts to the vehicle body X or the like operation on the floor part 6 is reduced.

In order to configure the transport carriage 2 including the lifter 4A without increasing the height of the floor part 6, it is necessary to protrude only a portion of the stage 12 that overlaps the guide 14C upward in a plan view. Therefore, the lifter 4A in accordance with the comparative embodiment requires a complicated design to realize a low floor of the floor part 6.

Furthermore, since the lifter 4A in accordance with the comparative embodiment does not include the case 18, the second bent part 10D and the third straight rod part 10E are not formed in the push chain 10. Thus, in the lifter 4A, all the parts of the push chain 10 which move above the chain support 20 along with the lowering of the stage 12 need to be the second straight rod part 10B.

This increases, in the lifter 4A, the distance of the chain support 20 in the second direction D2 that is necessary to align all of the second straight rod parts 10B above the chain support 20 when the stage 12 is positioned at the lower end. Therefore, in the lifter 4A, the length of the chain support 20 that is required with the elongation of the push chain 10 also increases, and thus the dimension of the entire lifter in the second direction D2 become enormous.

<Effect Brought about by Lifter in Accordance with the Present Embodiment>

In the lifter 4 in accordance with the present embodiment, the sprocket 16 engages with the push chain 10 on a side closer to the second straight rod part 10B than to the first bent part 10C. Thus, in the lifter 4, the sprocket 16 and the first straight rod part 10A are apart from each other. This reduces the interference between the sprocket 16 and the second guide 14B forming the flat surface parts 36 between which the roller 32 of the first straight rod part 10A is held.

Therefore, the lifter 4 has an increased degree of freedom of the position of the second guide 14B forming the flat surface parts 36, and enables achievement of a design that reduces the height of the guide 14 in the first direction D1. For example, sufficiently securing a distance between the sprocket 16 and the first straight rod part 10A allows the second guide 14B in accordance with the present embodiment to have the flat surface parts 36 that are seamlessly formed with the curved surface parts 34.

Therefore, with the above-described configuration, the lifter 4 in accordance with the present embodiment enables a reduction in the height of the guide 14 in the first direction D1 without requiring a complicated design, and thus enables a reduction in the height of the entire lifter in the first direction D1. The transport carriage 2 provided with the lifter 4 in accordance with the present embodiment enables achievement of a low floor of the floor part 6 without requiring a complicated design. Therefore, the transport carriage 2 enables a reduction of the burden of the worker Y raising and lowering the floor part 6 while simplifying the structure of the transport carriage 2, and also enables a wider space to be left on the floor part 6.

Further, the lifter 4 in accordance with the present embodiment enables a portion of the push chain 10 that moves to a level above the chain support 20 along with the lowering of the stage 12 to be stored, in the case 18, as the second bent part 10D and the third straight rod part 10E. Therefore, as compared with the lifter 4A in accordance with the comparative embodiment, the lifter 4 in accordance with the present embodiment reduces an increase of the length of the chain support 20 that is required along with the elongation of the push chain 10, and thus reduces the possibility that the dimension of the entire lifter in the second direction D2 becomes enormous. Considering this fact together with the fact, as described above, that the lifter 4 in accordance with the present embodiment enables a reduction in the height of the entire lifter in the first direction D1, the lifter 4 enables reductions in both the dimension in the raising and lowering direction and the dimension in a direction different from the raising and lowering direction.

In addition, as the configuration of the lifter 4, for example, a configuration in which the push chain 10 is pushed and pulled by a separate power unit at the end of the push chain 10, instead of the sprocket 16 is considered. Here, in the lifter 4 in accordance with the present embodiment, the push chain 10 is bent in the second bent part 10D, and the third straight rod part 10E is positioned above the second straight rod part 10B. Thus, regarding the lifter 4, for example, the configuration in which the push chain 10 is pushed and pulled by the above-described power unit at the end of the push chain 10 becomes a configuration in which the end of the third straight rod part 10E is pushed and pulled by the power unit. In this configuration, the position of the power unit also needs to be a position above the second straight rod part 10B, which leads to an increase in the height of the entire lifter in the first direction D1.

The lifter 4 in accordance with the present embodiment includes the sprocket 16 that engages with the second straight rod part 10B to drive the push chain 10 so that the push chain 10 moves forward and backward. Thus, as compared with the configuration in which the push chain 10 is pushed and pulled by the above-described power unit at the end of the push chain 10, the lifter 4 in accordance with the present embodiment enables a reduction in increase in the height of the entire lifter in the first direction D1.

Embodiment 2

<Lifter in Accordance with Another Embodiment>

The following will describe another embodiment of the present disclosure. Note that, for convenience of the description, members identical in function with members described in Embodiment 1 will be given identical reference signs, and description of such members will be omitted.

The transport carriage 2 in accordance with the present embodiment differs in configuration from the transport carriage 2 in accordance with Embodiment 1 in that the transport carriage 2 includes a lifter (raising and lowering apparatus) 52 instead of the lifter 4. The lifter 52 in accordance with the present embodiment will be described in detail with reference to FIGS. 6 and 7.

Figure 6:
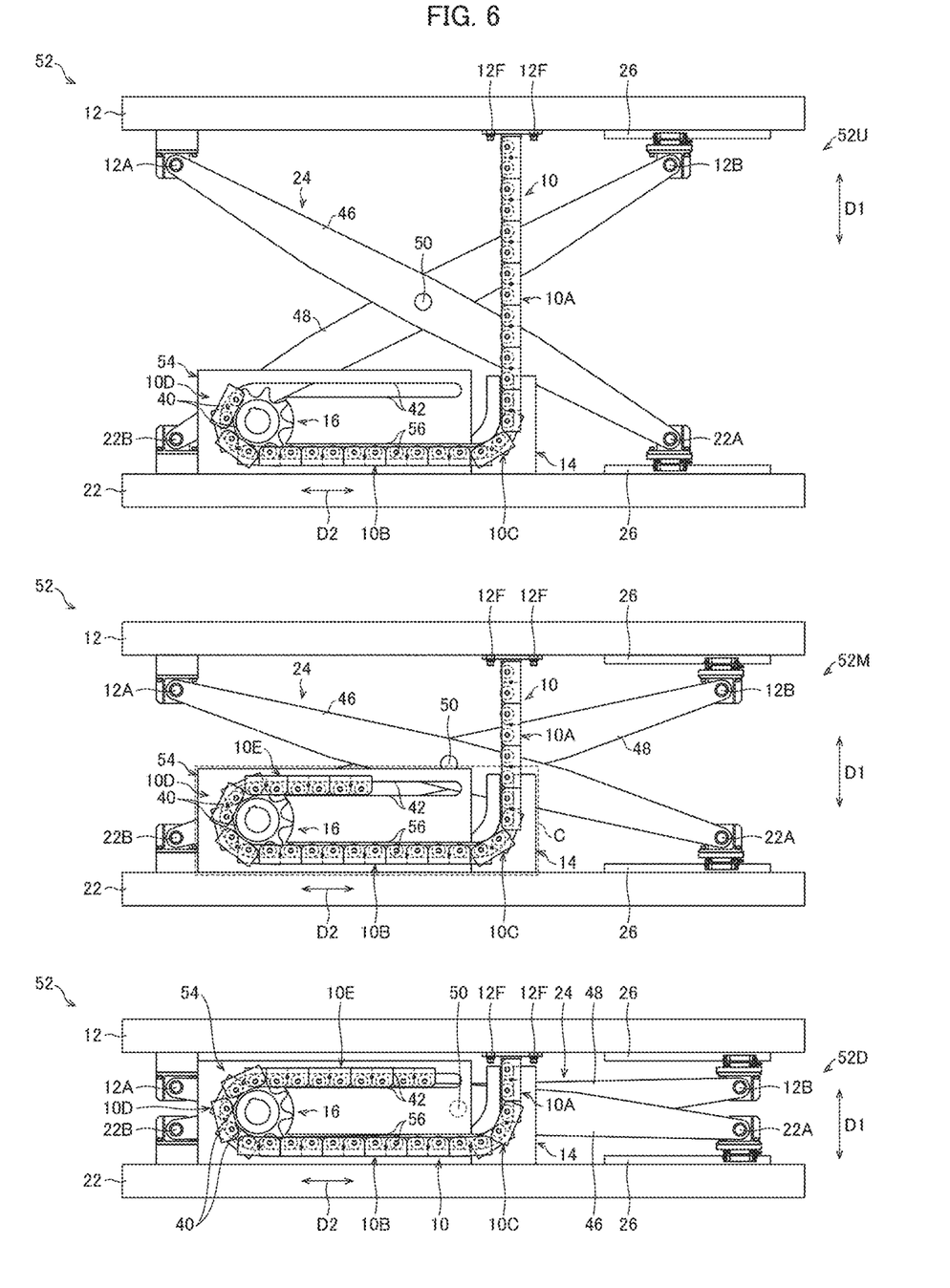
FIG. 6 is a schematic side view of a lifter in accordance with Embodiment 2 of the present disclosure.
Figure 7:
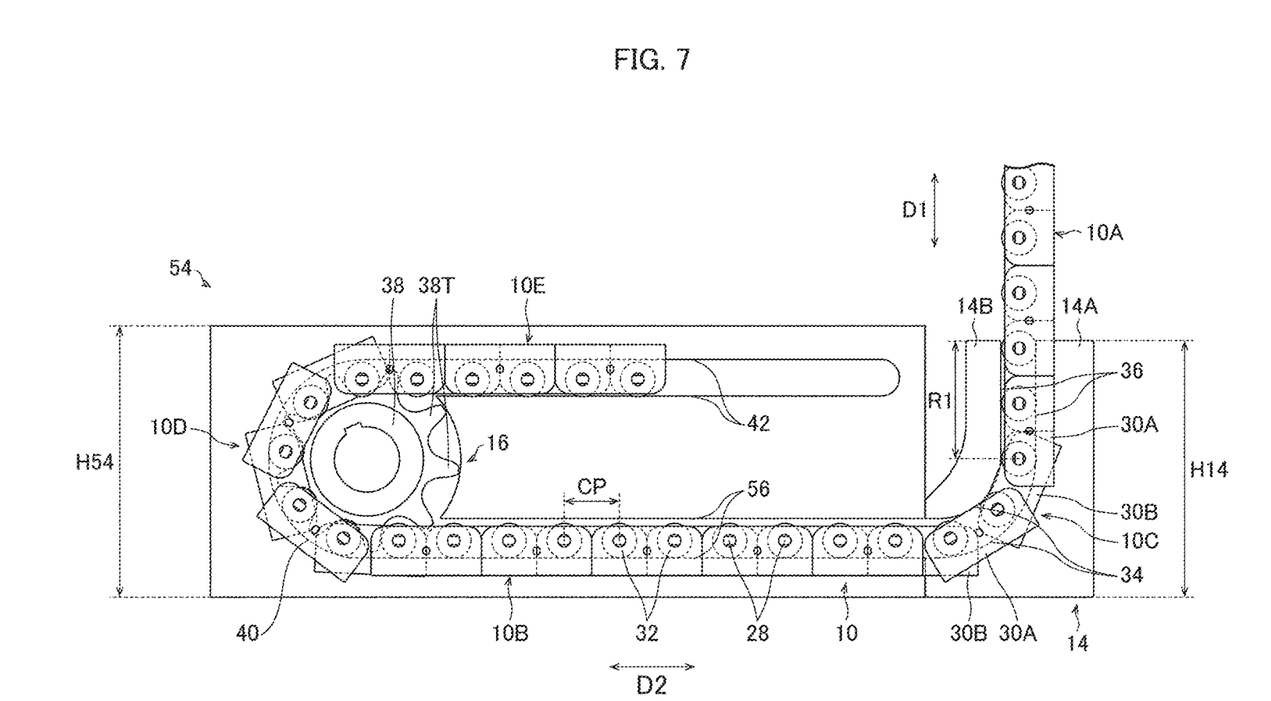
FIG. 7 is a schematic enlarged view of a part of a side surface of the lifter in accordance with Embodiment 2 of the present disclosure.

FIG. 6 is a schematic side view for describing the overall configuration of the lifter 52 in accordance with the present embodiment and the raising and lowering operation of the lifter 52. FIG. 6, as in FIG. 3, illustrates some members of the lifter 4 in a transparent manner. Further, FIG. 6, as in FIG. 3, illustrates a raised state 52U, an intermediate state 52M, and a lowered state 52D of the lifter 52. FIG. 7 is a schematic enlarged view illustrating, in an enlarged manner, only a push chain 10, a guide 14, a sprocket 16, and a case 54 (described later), which are located in a region C illustrated in FIG. 6, among the members of the lifter 4.

As compared with the lifter 4 in accordance with Embodiment 1, the lifter 52 in accordance with the present embodiment includes the case 54 instead of the case 18 and does not include the chain support 20. The case 54 stores the second straight rod part 10B, in addition to the above-described second bent part 10D and third straight rod part 10E. Thus, the case 54 further has a pair of flat surface parts 56 between which the roller 32 of the second straight rod part 10B is held.

Further, when comparison is made with the case 18, the case 54 has a pair of flat surface parts 42 between which the roller 32 of the third straight rod part 10E is held, but the case 54 has only one curved surface part 40 and is not configured such that the roller 32 of the second bent part 10D is held between the pair of curved surface parts 40. Instead, in the lifter 52 in accordance with the present embodiment, the sprocket 16 engages with the second bent part 10D. Thus, the roller 32 of the second bent part 10D is held between the curved surface part 40 of the case 54 and the sprocket 16.

Since the sprocket 16 engages with the second bent part 10D, the winding angle of the push chain 10 with respect to the sprocket 16 in the present embodiment is large as compared with the winding angle of the push chain 10 with respect to the sprocket 16 in Embodiment 1. Thus, in the present embodiment, the number of teeth 38T that engage with the push chain 10 is large, when comparison is made with Embodiment 1.

Thus, the lifter 52 enables a force for rotating the push chain 10 to be conveyed more efficiently as a force for the forward and backward movement of the push chain 10, and reduces disengagement between the push chain 10 and the sprocket 16. Further, the lifter 52 enables the sprocket 16 to be kept more efficiently from rotating against a force which is conveyed from the push chain 10 under a load such as the vehicle body X on the stage 12 and which is for rotating the sprocket 16. This enables the lifter 52 to increase a withstand load of the stage 12.

Except for the above points, the lifter 52 in accordance with the present embodiment includes the same configuration as the configuration of the lifter 4 in accordance with Embodiment 1. Therefore, in the lifter 52 in accordance with the present embodiment, like the lifter 4 in accordance with Embodiment 1, the sprocket 16 engages with the push chain 10 on a side closer to the second straight rod part 10B than to the first bent part 10C.

Therefore, for the lifter 52 in accordance with the present embodiment enables achievement of a design that reduces the height of the entire lifter in the first direction D1 without the need for a complicated design, for the same reason as the reason described for the lifter 4 in accordance with Embodiment 1. The transport carriage 2 which is provided with the lifter 52 in accordance with the present embodiment enables a reduction of the burden of the worker Y raising and lowering the floor part 6 while simplifying the structure of the transport carriage 2, and also enables a wider space to be left on the floor part 6.

For example, as illustrated in FIG. 7, the height from the lower end of the case 54 to the upper end thereof in the first direction D1 is defined as height H54. Here, the case 54 is also disposed on the upper surface of the base 22 which is substantially coplanar. Thus, a low height H54 indicates that the height of the case 54 in the first direction D1 is low in the lifter 4.

As is apparent from FIG. 7, the height H54 is higher than the height H14 that is a height of the guide 14 in the first direction D1. Here, for example, by designing such that the push chain 10 can be bent at a larger angle and making the diameter of the sprocket 16 smaller, it is possible to achieve a design that makes the height of the case 54 in the first direction D1 lower. Therefore, the lifter 4 enables a further reduction in height of the entire lifter in the first direction D1 by, for example, making the height H54 lower than the height H14.

The present disclosure is not limited to the above-described embodiments, but can be altered by a skilled person in the art within the scope of the claims. The present disclosure also encompasses, in its technical scope of the present disclosure, any embodiment derived by combining technical means disclosed in differing embodiments.

REFERENCE SIGNS LIST 2 transport carriage
4, 52 lifter
6 floor part
10 push chain
10A first straight rod part
10B second straight rod part
10C first bent part
10D second bent part
10E third straight rod part
12 stage
14 guide
16 sprocket
18, 54 case

The invention claimed is:
1. A raising and lowering apparatus comprising:
a push chain comprising: a first straight rod part that extends along a first direction; a second straight rod part that extends along a second direction which differs from the first direction; and a first bent part that is provided between the first straight rod part and the second straight rod part, the push chain being config- ured to move forward and backward in the first direction and the second direction;

a stage formed on the first straight rod part and configured to be raised and lowered along the first direction by forward and backward movement of the push chain;

a guide configured to guide the forward and backward movement of the push chain in at least a portion of the first straight rod part and in the first bent part; and a sprocket that engages with a portion of the push chain which is on a side closer to the second straight rod part than to the first bent part, the sprocket being configured to drive the push chain to move forward and backward, wherein the push chain is a roller chain which has: a plurality of pins; and a roller that is rotatably fitted to each of the plurality of pins, the sprocket is configured such that teeth of the sprocket push the roller to move the push chain forward and backward, and the guide has a pair of curved surface parts between which the roller included in the first bent part of the push chain is held.

2. The raising and lowering apparatus according to claim 1, wherein the sprocket engages with the portion of the push chain from a side of the push chain facing the stage.

3. The raising and lowering apparatus according to claim 1, wherein an angle which the first direction forms with a vertical direction is smaller than an angle which the second direction forms with the vertical direction.

4. The raising and lowering apparatus according to claim 1, wherein a portion of the guide which holds the first straight rod part has a length, along the first direction, that is equal to or greater than twice a chain pitch of the push chain.

5. The raising and lowering apparatus according to claim 1, wherein the guide has a pair of curved surface parts between which the first bent part is held and a pair of flat surface parts between which the first straight rod part is held and which extend along the first direction.

6. The raising and lowering apparatus according to claim 1, wherein a height of the sprocket in the first direction is equal to or lower than a height of the guide in the first direction.

7. The raising and lowering apparatus according to claim 1, further comprising:

a case that accommodates at least the second straight rod part, wherein a height of the case in the first direction is equal to or lower than a height of the guide in the first direction.

8. The raising and lowering apparatus according to claim 1, wherein the push chain further comprises: a third straight rod part that is positioned on an opposite side of the second straight rod part from the first straight rod part and that extends along a third direction which is a direction such that an angle which the third direction forms with the second direction is smaller than an angle which the third direction forms with the first direction; and a second bent part that is provided between the second straight rod part and the third straight rod part.

9. The raising and lowering apparatus according to claim 1, wherein the sprocket engages with the second straight rod part.

10. The raising and lowering apparatus according to claim 8, wherein the sprocket engages with the second bent part.

11. A transport carriage comprising the raising and lowering apparatus according to claim 1, wherein an angle which the first direction forms with a vertical direction is smaller than an angle which a transport direction of the transport carriage forms with the vertical direction.

* * * * *